(12) United States Patent
Paolini et al.

(10) Patent No.: US 11,267,578 B2
(45) Date of Patent: Mar. 8, 2022

(54) HINGE ASSEMBLY

(71) Applicant: ROHR, INC., Chula Vista, CA (US)

(72) Inventors: Thomas Paolini, Felton, CA (US); Marc Schommer, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 503 days.

(21) Appl. No.: 16/008,688

(22) Filed: Jun. 14, 2018

(65) Prior Publication Data

US 2018/0362172 A1 Dec. 20, 2018

Related U.S. Application Data

(60) Provisional application No. 62/521,955, filed on Jun. 19, 2017.

(51) Int. Cl.
| | |
|---|---|
| *B64D 29/06* | (2006.01) |
| *B64D 29/02* | (2006.01) |
| *B64D 27/12* | (2006.01) |
| *B64D 27/26* | (2006.01) |
| *F01D 25/26* | (2006.01) |

(52) U.S. Cl.
CPC ............ *B64D 29/06* (2013.01); *B64D 27/12* (2013.01); *B64D 27/26* (2013.01); *B64D 29/02* (2013.01); *F01D 25/265* (2013.01); *B64D 2027/262* (2013.01)

(58) Field of Classification Search
CPC ... B64D 29/06; B64D 27/26; B64D 2027/262
See application file for complete search history.

(56) References Cited

U.S. PATENT DOCUMENTS

| | | | |
|---|---|---|---|
| 4,821,980 A * | 4/1989 | Clausen | B64D 27/14 244/54 |
| 5,203,525 A | 4/1993 | Remlaoui | |
| 7,959,107 B2 | 6/2011 | Beaufort | |
| 8,002,217 B2 | 8/2011 | Sternberger | |
| 2009/0266932 A1* | 10/2009 | Roche | B64D 27/18 244/54 |
| 2013/0259641 A1 | 10/2013 | Stewart et al. | |
| 2015/0369083 A1* | 12/2015 | Mercier | B64D 29/06 415/214.1 |

* cited by examiner

*Primary Examiner* — Jessica B Wong
(74) *Attorney, Agent, or Firm* — Snell & Wilmer L.L.P.

(57) ABSTRACT

A hinge assembly may include a support structure and a panel hingedly coupled to the support structure via at least one hinge of a plurality of hinges. The plurality of hinges may include a first hinge having a first rotational axis, a second hinge having a second rotational, and a third hinge having a third rotational axis. The second rotational axis may be collinear and aligned with the third rotational axis such that the second hinge and the third hinge have a shared concentric axis. The first rotational axis may be eccentric to the shared concentric axis. The hinge assembly may be implemented in a nacelle to improve the aerodynamics of the interfaces between the fan cowl and adjacent structure.

11 Claims, 6 Drawing Sheets

HINGE ASSEMBLY

CROSS-REFERENCE TO RELATED APPLICATION

This application claims the benefit of U.S. Provisional Application No. 62/521,955, filed Jun. 19, 2017 entitled "HINGE ASSEMBLY," which is incorporated herein by reference in its entity for all purposes.

FIELD

The present disclosure relates to hinge assemblies, and more specifically, to hinge assemblies of nacelles for gas turbine engines.

BACKGROUND

Aircraft generally include a nacelle and a gas turbine engine for propulsion. Conventional nacelles often include a fan cowl that is rotatably and/or pivotally connected to a structure, such as a pylon connecting the nacelle to a wing of an aircraft. Such fan cowls may be configured to pivot between open and closed positions, thereby allowing access to components of the gas turbine engine in the open position and forming an aerodynamic shell over the components of the gas turbine engine in the closed position.

However, fan cowls may not be flush with adjacent structure of the nacelle (e.g., during flight), thereby resulting in discontinuities across interfaces/junctions between the fan cowl and the adjacent structure of the nacelle. In other words, interfaces between the fan cowl and adjacent structure may have steps, gaps, and/or deflections that may increase the drag and lower the performance of the nacelle.

SUMMARY

In various embodiments, the present disclosure provides a hinge assembly that includes a panel and a plurality of hinges coupled to the panel. The plurality of hinges may include a first hinge having a first rotational axis and a second hinge having a second rotational axis. The plurality of hinges may also include a third hinge having a third rotational axis. The second rotational axis may be collinear and aligned with the third rotational axis such that the second hinge and the third hinge have a shared concentric axis. The first rotational axis may be eccentric to the shared concentric axis.

In various embodiments, the hinge assembly further includes a support structure. The panel may be hingedly coupled to the support structure via at least one hinge of the plurality of hinges. The second hinge and the third hinge may be directly mounted to the support structure and the first hinge may be indirectly mounted to the support structure. In various embodiments, the first hinge is floating relative to the support structure. The first hinge is attached to a first portion of the panel, the second hinge is attached to a second portion of the panel, and the third hinge is attached to a third portion of the panel, according to various embodiments. In response to rotation of the panel about the plurality of hinges, the first portion of the panel may experience a preload response that is different than the second portion and the third portion of the panel. In various embodiments, the first portion, the second portion, and the third portion of the panel are integrally formed of a unitary material.

Also disclosed herein, according to various embodiments, is a nacelle that includes a fan cowl and a plurality of hinges coupled to the fan cowl. The plurality of hinges may include a first hinge having a first rotational axis, a second hinge having a second rotational axis, and a third hinge having a third rotational axis. The second rotational axis may be collinear and aligned with the third rotational axis such that the second hinge and the third hinge have a shared concentric axis. The first rotational axis may be eccentric to the shared concentric axis.

In various embodiments, the fan cowl is a first fan cowl, the plurality of hinges is a first plurality of hinges, and the shared concentric axis is a first shared concentric axis. In such embodiments, the nacelle may further include a second fan cowl and a second plurality of hinges. The second plurality of hinges may include a fourth hinge having a fourth rotational axis, a fifth hinge having a fifth rotational axis, and a sixth hinge having a sixth rotational axis. The fifth rotational axis may be collinear and aligned with the sixth rotational axis such that the fifth hinge and the sixth hinge have a second shared concentric axis. The fourth rotational axis may be eccentric to the second shared concentric axis.

In various embodiments, a first distance between the first rotational axis and the fourth rotational axis is less than a second distance between the first shared concentric axis and the second shared concentric axis. In various embodiments, the first rotational axis is radially outward of the first shared concentric axis and the fourth rotational axis is radially outward of the second shared concentric axis. In various embodiments, the nacelle further includes a pylon, wherein the first fan cowl is hingedly coupled to the pylon via at least one hinge of the first plurality of hinges and the second fan cowl is hingedly coupled to the pylon via at least one hinge of the second plurality of hinges. In various embodiments, the second hinge, the third hinge, the firth hinge, and the sixth hinge are directly mounted to the pylon and the first hinge and the fourth hinge are indirectly mounted to the pylon. In various embodiments, the first fan cowl is disposed on one of an inboard side and an outboard side of a gas turbine engine mounted to an aircraft and the second fan cowl is disposed on the other of the inboard side and the outboard side of the gas turbine engine mounted to the aircraft.

In various embodiments, the nacelle further includes a beam extending between the first hinge and the fourth hinge. In various embodiments, the first hinge and the fourth hinge are floating relative to the pylon. In various embodiments, the first hinge is attached to a first portion of the first fan cowl, the second hinge is attached to a second portion of the first fan cowl, the third hinge is attached to a third portion of the first fan cowl, the fourth hinge is attached to a fourth portion of the second fan cowl, the fifth hinge is attached to a fifth portion of the second fan cowl, and the sixth hinge is attached to a sixth portion of the second fan cowl. In various embodiments, in response to rotation of the first fan cowl and the second fan cowl to respective closed positions, the first portion of the first fan cowl and the fourth portion of the second fan cowl experience a preload response that is different than the second portion and the third portion of the first fan cowl and the fifth portion and the sixth portion of the second fan cowl, respectively. In various embodiments, for example, the first portion is a first forward corner section of the first fan cowl and the fourth portion is a second forward corner section of the second fan cowl and, in response to rotation of the first fan cowl and the second fan cowl to respective closed positions, the first forward corner section of the first fan cowl and the second forward corner section of the second fan cowl are configured to be substantially flush with a fan inlet structure.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a nacelle. As used herein, "forward" refers to the direction associated with the intake (e.g., the front end) of a nacelle.

A first component that is "radially outward" of a second component means that the first component is positioned at a greater distance away from a centerline axis of a nacelle (e.g., an engine central longitudinal axis) than the second component. A first component that is "radially inward" of a second component means that the first component is positioned closer to the centerline axis than the second component. The terminology "radially outward" and "radially inward" may also be used relative to references other than the centerline axis of a nacelle.

Figure 1:
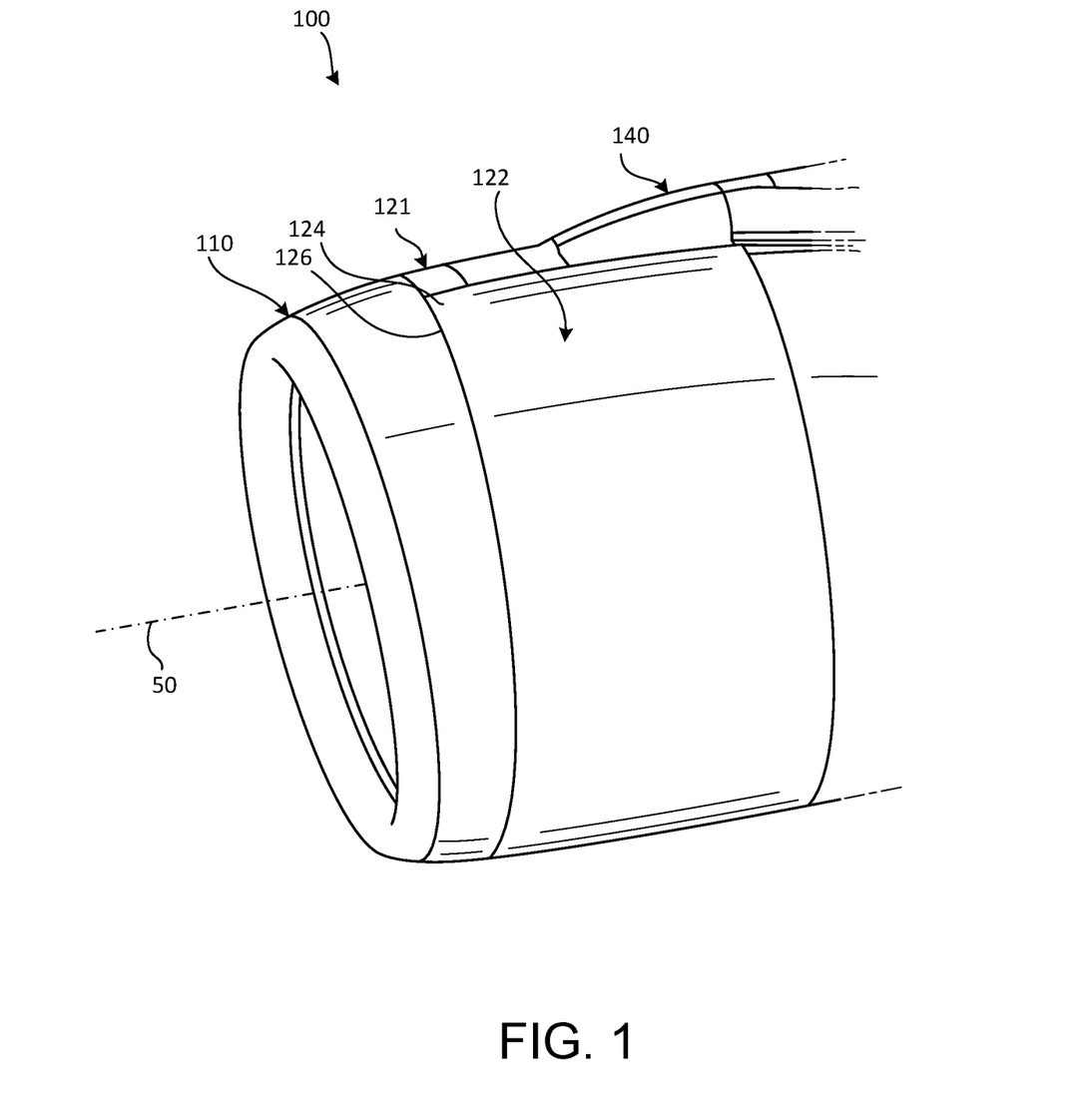
FIG. 1 illustrates a perspective view of a nacelle for a gas turbine engine, in accordance with various embodiments.

With reference to FIG. 1, a nacelle 100 for a gas turbine engine is illustrated according to various embodiments. The nacelle 100 may be suitable for an aircraft and the nacelle 100 may be coupled to a pylon 140, which may mount the nacelle 100 to an aircraft wing or aircraft body. The nacelle 100 may have a centerline 50 and may include an inlet 110, a fan cowl, and a thrust reverser. Fan cowl may include two halves (e.g., a first fan cowl 121 and a second fan cowl 122) that are hingedly/pivotally mounted to pylon 140 via one or more hinges, as described in greater detail below. Thus, the nacelle 100 may include a first fan cowl 121, which may be a right-hand (RH) fan cowl, and a second fan cowl 122, which may be a left-hand (LH) fan cowl that can be rotated between open and closed positions (e.g., allowing access to components within the nacelle 100).

As mentioned above, conventional fan cowls may be improperly aligned with adjacent structure and thus aero steps, gaps, and/or other aerodynamic discontinuities may exist at the interface of conventional fan cowls with adjacent structure. These discontinuities often increase the drag of conventional nacelles and thus lower the aerodynamic performance of conventional nacelles. Accordingly, the subject matter of the present disclosure provides a hinge assembly 105 that can be implemented with fan cowls of nacelles that overcomes at least some of these aforementioned shortcomings, according to various embodiments. For example, without the hinge assembly 105 described herein, a forward corner section (e.g., forward corner section 124) of a fan cowl (e.g., second fan cowl 122) of a nacelle (e.g., nacelle 100) would potentially deflect radially inward or radially outward and thus would potentially result in aerodynamic discontinuities at the interface/junction between the fan cowl and adjacent structure (e.g., fan inlet structure 110).

While numerous details are included herein pertaining to implementing a hinge assembly with fan cowls of gas turbine engines, the hinge assembly may be useful in other implementations, such as with other sections of the nacelle 100 or other aircraft access doors, etc. Further, the hinge assembly may also be utilized in non-aircraft applications.

Figure 2:
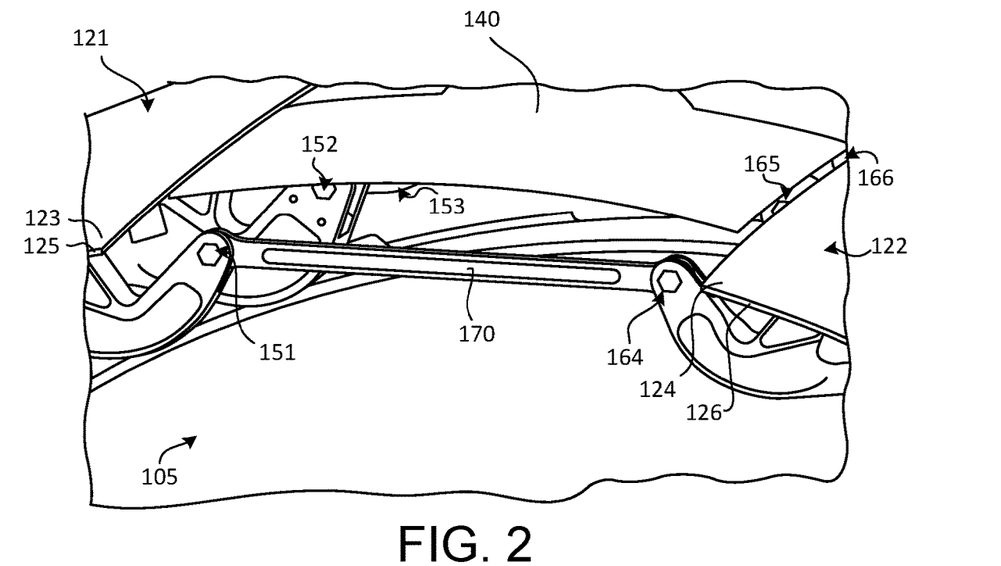
FIGS. 2 and 3 illustrate perspective views of a hinge assembly of a nacelle, in accordance with various embodiments.
Figure 3:
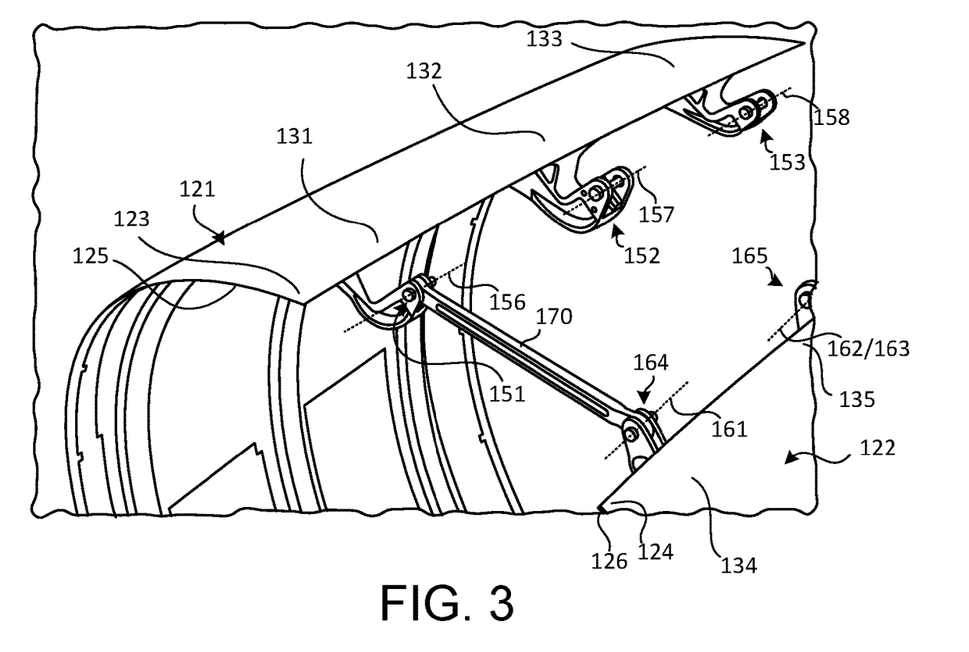

The hinge assembly 105, according to various embodiments and with reference to FIGS. 2 and 3, includes a support structure, such as the pylon 140 via which the nacelle 100 is mounted to the aircraft, and a panel, such as the first and second fan cowls 121, 122, that is hingedly coupled to the support structure via at least one hinge of a first plurality of hinges. For example, the first plurality of hinges may include a first hinge 151, a second hinge 152, and a third hinge 153. Each of the hinges 151, 152, 153 may have a respective rotational axis 156, 157, 158. Said differently, the first hinge 151 may have a first rotational axis 156, the second hinge 152 may have a second rotational axis 157, and the third hinge 153 may have a third rotational axis 158.

In various embodiments, and as described in greater detail below with reference to FIGS. 3-6, the second rotational axis 157 of the second hinge 152 is collinear and aligned with the third rotational axis 158 of the third hinge 153 such that the second hinge 152 and the third hinge 153 have a shared concentric axis 155 (momentary reference to FIGS. 4 and 5A), according to various embodiments. The first rotational axis 156 of the first hinge 151 is eccentric to this shared concentric axis 155, according to various embodiments. The eccentricity of the first hinge 151 relative the shared concentric axis 155, according to various embodiments, alters the load applied to the panel (e.g., the first fan cowl 121) to improve the continuity between the panel and adjacent structures (e.g., the fan inlet structure 110 of the nacelle 100). For example, the eccentricity of the first hinge 151 may facilitate alignment and continuity of the first forward corner section 123 of the first fan cowl 121 with the fan inlet structure 110 (e.g., leading edge 125 of the first fan cowl 121 may be substantially flush with the fan inlet structure 110). In various embodiments, the hinge assembly may include additional hinges aligned with the shared concentric axis 155 (e.g., the assembly is not limited to three hinges). The first fan cowl 121 may be disposed on a right side of the nacelle 100 (e.g., an outboard side of the nacelle 100 when mounted to an aircraft) and the second fan cowl 122 may be disposed on a left side of the nacelle (e.g., an inboard side of the nacelle 100 when mounted to an aircraft). Again, additional details pertaining to the eccentricity of the hinge assembly are included below with reference to FIGS. 4-6.

The nacelle inlet structure 110 and various components, such as the gas turbine engine, housed within the nacelle 100 are hidden (not visible) in FIGS. 2-5B to avoid obscuring the clarity of the depiction of the hinge assembly. Further, the pylon 140 is also hidden (not visible) in FIGS. 3-5B for the same reason.

In various embodiments, and with continued reference to FIGS. 2 and 3, the second and third hinges 152, 153 are directly mounted to the support structure (e.g., the pylon 140) and the first hinge 151 is indirectly mounted to the support structure (e.g., the pylon 140). Said differently, the first hinge 151 may be a floating hinge. For example, the first hinge 151 may be coupled to another structure, such as beam 170, and thus the first hinge 151 may not be directly mounted to the same support structure (e.g., the pylon 140) to which the second and third hinges 152, 153 are directly mounted.

In various embodiments, the second fan cowl 122 of the nacelle 100 may be rotatably, hingedly, and/or pivotally coupled to the pylon 140 via a second plurality of hinges. The second plurality of hinges may be substantially similar in configuration and arrangement to the first plurality of hinges described above, just disposed on an opposite side of the nacelle 100. For example, the second plurality of hinges may include a fourth hinge 164, a fifth hinge 165, and a sixth hinge 166. Each of these hinges 164, 165, 166 may have a respective rotational axis. Said differently, the fourth hinge 164 may have a fourth rotational axis 161, the fifth hinge 165 may have a fifth rotational axis 162, and the sixth hinge 166 may have a sixth rotational axis 163.

Similar to the first plurality of hinges 151, 152, 153, the fifth rotational axis 162 of the fifth hinge 165 is collinear and aligned with the sixth rotational axis 163 of the sixth hinge 166 such that the fifth hinge 165 and the sixth hinge 166 have a second shared concentric axis 255 (with momentary reference to FIG. 5B), according to various embodiments. The fourth rotational axis 161 of the fourth hinge 164 is eccentric to this second shared concentric axis 255, according to various embodiments. The eccentricity of the fourth hinge 164 relative the second shared concentric axis 255, according to various embodiments, alters the load applied to the panel (e.g., the second fan cowl 122) to improve the continuity between the panel and adjacent structures (e.g., the fan inlet structure 110 of the nacelle 100). For example, the eccentricity of the fourth hinge 164 may facilitate alignment and continuity of the second forward corner section 124 of the second fan cowl 122 with the fan inlet structure 110 (e.g., leading edge 126 of the second fan cowl 122 may be substantially flush with the fan inlet structure 110). In various embodiments, all of the rotational axis 156, 157, 158, 161, 162, 163 may be parallel with each other. Additional details pertaining to the eccentricity of the hinge assembly are included below with reference to FIGS. 4-6.

Figure 4:
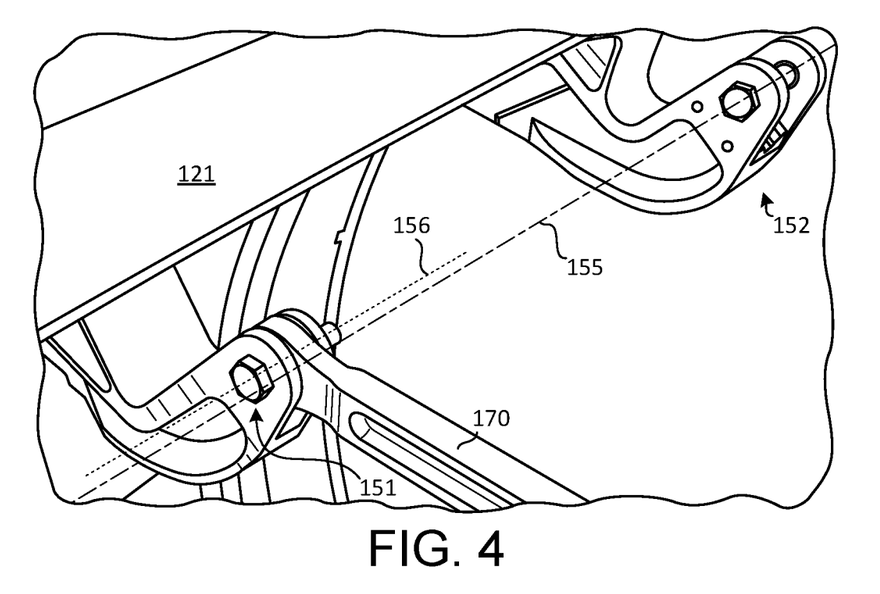
FIGS. 4, 5A, and 5B illustrate perspective views of a hinge assembly showing an eccentric configuration of hinges, in accordance with various embodiments.
Figure 5A:
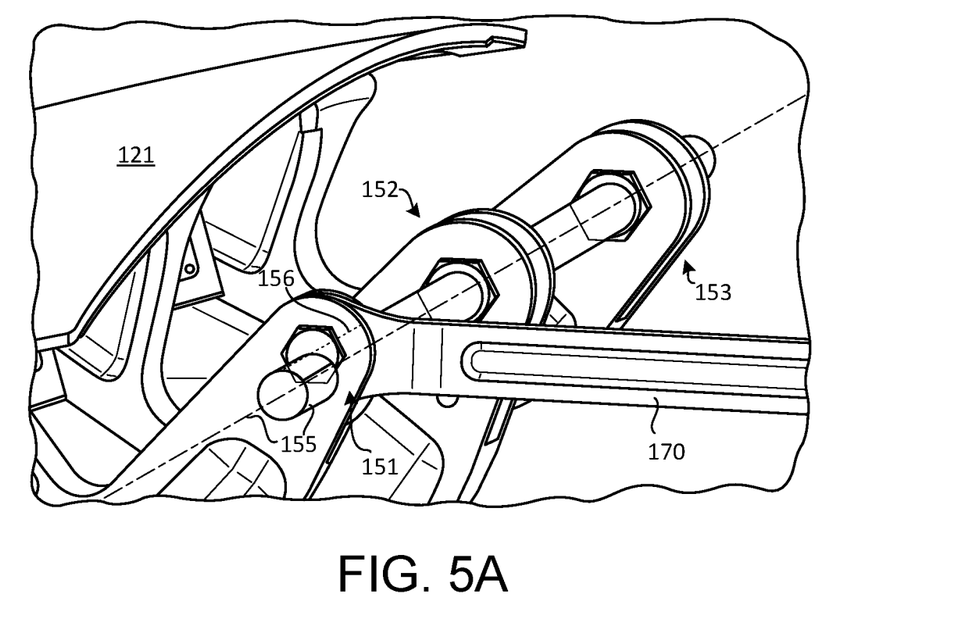
Figure 5B:
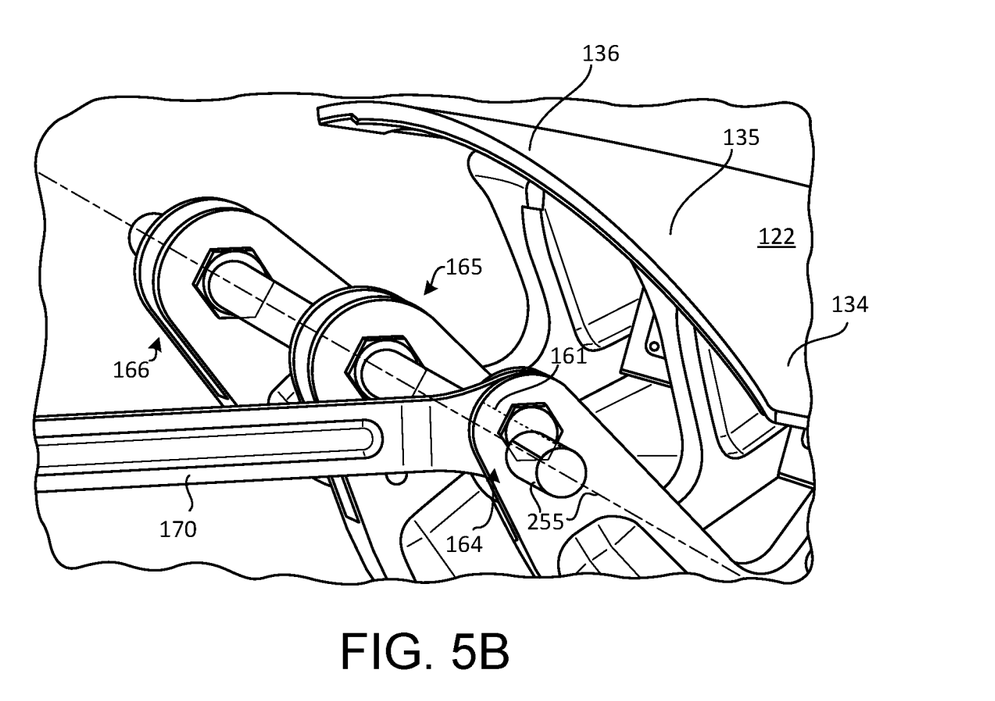
Figure 6:
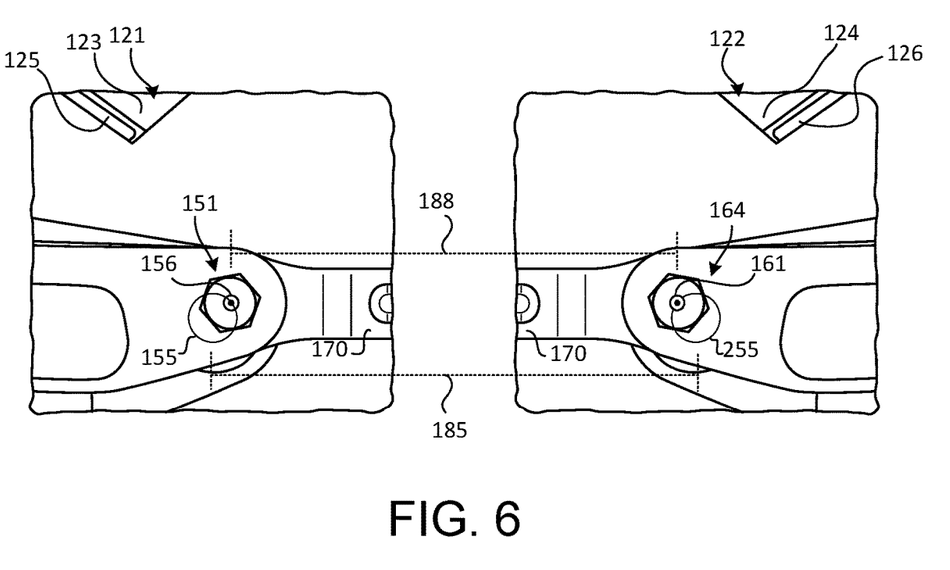
FIG. 6 illustrates a front view of a hinge assembly of a nacelle showing an eccentric configuration of hinges, in accordance with various embodiments.

In various embodiments, and with reference to FIGS. 4-6, the intentional misalignment (eccentricity) of the first rotational axis 156 of the first hinge 151 relative to the first shared concentric axis 155 and the intentional misalignment (eccentricity) of the fourth rotational axis 161 of the fourth hinge 164 relative to the second shared concentric axis 255 causes the respective panels (e.g., fan cowls 121, 122) to be preloaded. For example, the panels may experience a preload response that alters the fit of the panel relative to adjacent structure, such as the fan inlet structure. Said differently, the mechanical load on the first fan cowl 121, due to the eccentric configuration and/or in response to rotation of the first fan cowl 121 about the hinges 151, 152, 153, increases and causes a corresponding change to the shape and/or geometry of the first fan cowl 121 to improve the aerodynamic continuity between adjacent structures. The magnitude of the eccentricity shown in the figures is not necessarily indicative of the actual eccentricity of the hinge assembly. In various embodiments, for example, the magnitude of the eccentricity of the hinge assembly (e.g., the offset between the shared concentric axis 155 and the first rotational axis 156) is between about 0.05 inches (0.13 centimeters) and about 0.75 inches (1.9 centimeters). In various embodiments, the magnitude of the eccentricity of the hinge assembly is between about 0.1 inches (0.25 centimeters) and about 0.5 inches (1.27 centimeters). In various embodiments, the magnitude of the eccentricity of the hinge assembly is between about 0.2 inches (0.51 centimeters) and about 0.4 inches (1.01 centimeters). As used in this context only, the term "about" means plus or minus 5% of the indicated value.

In various embodiments, and with momentary reference to FIG. 3, the first hinge 151 may be coupled to a first portion 131 of the first fan cowl 121, the second hinge 152 may be coupled to a second portion 132 of the first fan cowl 121, and the third hinge 153 may be coupled to a third portion 133 of the first fan cowl 121. In various embodiments, the hinges 151, 152, 153 are consecutively positioned such that the first hinge 151 is positioned axially forward of the second and third hinges 152, 153. This eccentricity may cause the first portion 131 of the first fan cowl 121 to have loaded properties and a load response that is different than the second and third portions 132, 133 of the first fan cowl 121. Said differently, the load, at least on the first portion 131 of the first fan cowl 121 caused by the eccentric configuration of the hinges 151, 152, 153, may cause the first fan cowl 121 (e.g., at least the first portion 131 thereof) to be preloaded and thus have an improved fit around the partial circumference of the nacelle. This improved fit may, for example, improve continuity at the interface between the first fan cowl 121 and adjacent structure, thereby improving operation of the nacelle 100. In various embodiments, the portions 131, 132, 133 of the first fan cowl 121 may be integrally formed of a unitary material.

The same may be true for the second plurality of hinges 164, 165, 166 and the second fan cowl 122. That is, the fourth hinge 164 may be coupled to a fourth portion 134 (with momentary reference to FIG. 5B) of the second fan cowl 122, the fifth hinge 165 may be coupled to a fifth portion 135 of the second fan cowl 122, and the sixth hinge 166 may be coupled to a sixth portion 136 of the second fan cowl 122. Accordingly, in response to rotation of the first and second fan cowls 121, 122 to respective closed positions, the first forward corner section 123, which may be the first portion 131 the first fan cowl 121, and the second forward corner section 124, which may be the fourth portion 134 of the second fan cowl 122, are configured to be substantially and respectively flush with the fan inlet structure 110. In various embodiments, the portions 134, 135, 136 of the second fan cowl 122 may be integrally formed of a unitary material.

As mentioned above, the first hinge 151 and the fourth hinge 164 may be a floating hinge that is not directly mounted to the support structure (e.g., the pylon 140). Instead, and according to various embodiments, the hinge assembly may include beam 170 extending between the first hinge 151 and the fourth hinge 164 such that the first hinge 151 and the fourth hinge 164 are "floating" (e.g., not directly mounted) relative to the support structure (e.g., pylon 140). In various embodiments, the beam 170 provides a level of support to the "floating" hinges 151, 164 and thus helps to maintain the eccentricity of said hinges 151, 164. In various embodiments, and with reference to FIG. 6, the beam 170 may facilitate maintaining a first distance 188 between the first hinge 151 (i.e., the first rotational axis 156 thereof) and the fourth hinge 164 (i.e., the fourth rotational axis 161 thereof) that is less than a second distance 185 between the first shared concentric axis 155 and the second shared concentric axis 255. In various embodiments, and with continued reference to FIG. 6, the first rotational axis 156 of the first hinge 151 is radially outward of the first shared concentric axis 155 and the fourth rotational axis 161 of the fourth hinge 164 is radially outward of the second shared concentric axis 255.

In various embodiments, in response to the fan cowls 121, 122 being in the open position, the beam 170 experiences nominal tensile stress. As the fan cowls 121, 122 are hingedly rotated from the open position to the closed position, the eccentric offset causes the tensile stress in the beam 170 to increase, which results in a compressed load on the fan cowls 121, 122 (e.g., at least respective portions thereof) and/or results in tensile strain along the beam 170, according to various embodiments. Said differently, the hinge assembly may be configured so that rotation of the fan cowls 121, 122 from the open position to the closed position increases the tensile stress in the beam, which produces a corresponding strain in the fan cowls 121, 122 to improve the fit (e.g., improve aerodynamics) of the fan cowls 121, 122 relative to adjacent structure, such as the fan inlet structure 110.

Figure 7A:
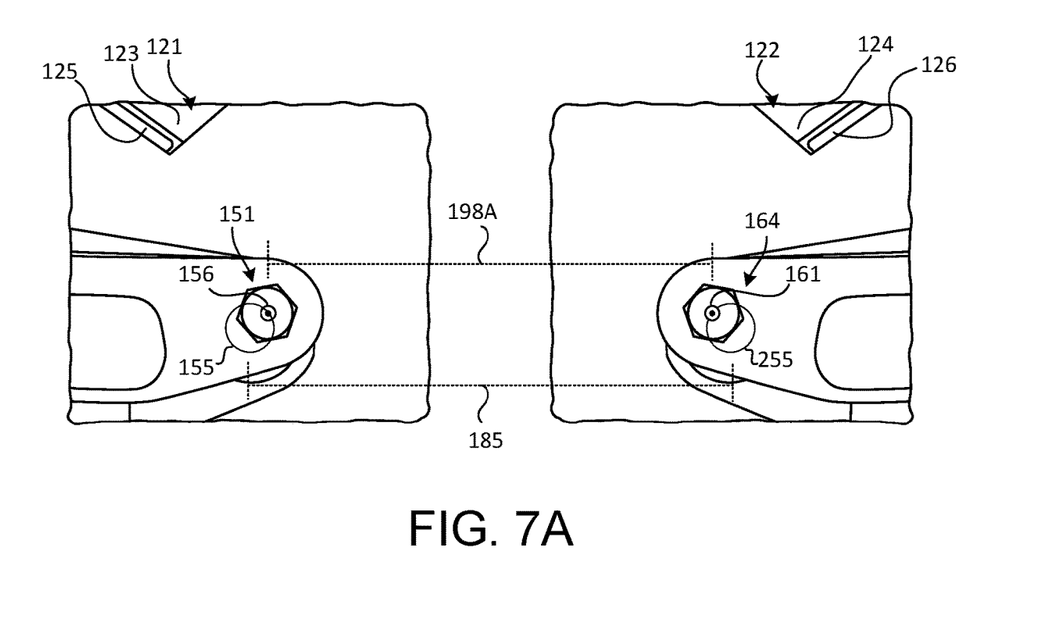
FIGS. 7A and 7B illustrate a front view of a hinge assembly of an open and closed nacelle, respectively, without a connecting beam extending between eccentric hinges, in accordance with various embodiments.
Figure 7B:
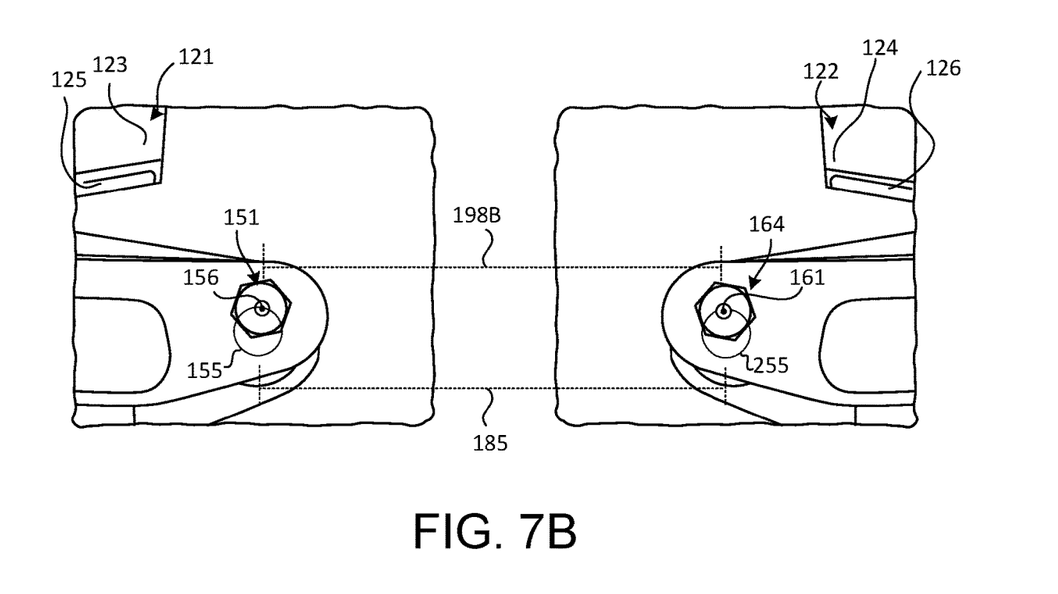

To further clarify how the fan cowls 121, 122 are preloaded when closed, FIGS. 7A and 7B show the eccentric hinge assembly without the beam 170. More specifically, FIGS. 7A and 7B show, if the beam 170 were not included, the difference between the hypothetical position of the first and fourth hinges 151, 164 when the fan cowls 121, 122 are open (FIG. 7A) versus the hypothetical position of the first and fourth hinges 151, 164 when the fan cowls 121, 122 are closed (FIG. 7B). That is, if beam 170 were not included in the assembly and thus if the distance 188 between hinges 151, 164 was not fixed, the eccentricity of the first and fourth hinges 151, 164 would cause the distance 198A, 198B between the first hinge 151 and the fourth hinge 164 to change as the fan cowls 121, 122 move between the open and closed positions. As shown in FIG. 7A, with the fan cowls 121, 122 in the open position, the first hinge 151 and the fourth hinge 164 would be displaced apart from each other a first distance 198A. As shown in FIG. 7B, with the fan cowls 121, 122 in the closed position, the first hinge 151 and the fourth hinge 164 would be displaced apart from each other a second distance 198B that is, according to various embodiments, greater than the first distance 198A. That is, but for the beam 170, the distance between the hinges 151, 164 would change. This "would-be" distance change is caused by the eccentric configuration of the hinges 151, 164 and is what imparts the force/tension in the beam, which thereby results in mechanical load transferred to the fan cowls 121, 122 to decrease the amplitude of deflection/continuity issues, as described above.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nacelle having a forward end and an aft end, the nacelle comprising:
    a pylon;
    a first fan cowl hingedly coupled to the pylon;
    a first plurality of hinges coupled to the first fan cowl, wherein the first plurality of hinges comprises:
        a first hinge attached to the first fan cowl and floating relative to the pylon, the first hinge having a first rotational axis;
        a second hinge attached to the first fan cowl and the pylon and having a second rotational axis; and
        a third hinge attached to the first fan cowl and the pylon and having a third rotational axis, wherein the second rotational axis is collinear and aligned with the third rotational axis such that the second hinge and the third hinge have a first shared concentric axis, wherein the first rotational axis is eccentric to the first shared concentric axis, and wherein the first rotational axis is parallel to the first shared concentric axis, and wherein the first hinge is positioned axially forward of the second hinge and the third hinge;
    a second fan cowl hingedly coupled to the pylon;
    a second plurality of hinges coupled to the second fan cowl, wherein the second plurality of hinges comprises:
        a fourth hinge attached to the second fan cowl and floating relative to the pylon, the fourth hinge having a fourth rotational axis;
        a fifth hinge attached to the second fan cowl and the pylon and having a fifth rotational axis; and
        a sixth hinge attached to the second fan cowl and the pylon and having a sixth rotational axis, wherein the fifth rotational axis is collinear and aligned with the sixth rotational axis such that the fifth hinge and the sixth hinge have a second shared concentric axis, wherein the fourth rotational axis is eccentric to the second shared concentric axis, and wherein the fourth hinge is positioned axially forward of the fifth hinge and the sixth hinge; and
    a beam connected to the first hinge and the fourth hinge.

2. The nacelle of claim 1, wherein a first distance between the first rotational axis and the fourth rotational axis is less than a second distance between the first shared concentric axis and the second shared concentric axis.

3. The nacelle of claim 1, wherein the first rotational axis is radially outward of the first shared concentric axis and the fourth rotational axis is radially outward of the second shared concentric axis.

4. The nacelle of claim 1, wherein the second hinge, the third hinge, the fifth hinge, and the sixth hinge are directly mounted to the pylon.

5. The nacelle of claim 4, wherein the first fan cowl is disposed on one of an inboard side and an outboard side of a gas turbine engine mounted to an aircraft and the second fan cowl is disposed on the other of the inboard side and the outboard side of the gas turbine engine mounted to the aircraft.

6. The nacelle of claim 1, wherein the first hinge is attached to a first portion of the first fan cowl, the second hinge is attached to a second portion of the first fan cowl, the third hinge is attached to a third portion of the first fan cowl, the fourth hinge is attached to a fourth portion of the second fan cowl, the fifth hinge is attached to a fifth portion of the second fan cowl, and the sixth hinge is attached to a sixth portion of the second fan cowl.

7. The nacelle of claim 6, wherein in response to rotation of the first fan cowl and the second fan cowl to respective closed positions, the first portion of the first fan cowl and the fourth portion of the second fan cowl experience a preload response that is different than the second portion and the third portion of the first fan cowl and the fifth portion and the sixth portion of the second fan cowl, respectively.

8. The nacelle of claim 6, wherein the first portion is a first forward-most corner section of the first fan cowl and the fourth portion is a second forward-most corner section of the second fan cowl.

9. The nacelle of claim 8, wherein in response to rotation of the first fan cowl and the second fan cowl to respective closed positions, the first forward-most corner section of the first fan cowl and the second forward-most corner section of the second fan cowl are configured to be substantially flush with a fan inlet structure.

10. The nacelle of claim 1, wherein the first hinge is a first axially forward-most hinge of first fan cowl.

11. The nacelle of claim 10, wherein the fourth hinge is a second axially forward-most hinge of second fan cowl.

* * * * *